United States Patent [19]

MaKosch

[11] Patent Number: 4,714,348

[45] Date of Patent: Dec. 22, 1987

[54] METHOD AND ARRANGEMENT FOR OPTICALLY DETERMINING SURFACE PROFILES

[75] Inventor: Gunter MaKosch, Sindelfingen-Maichingen, Fed. Rep. of Germany

[73] Assignee: International Business Machines Corporation, Armonk, N.Y.

[21] Appl. No.: 940,667

[22] Filed: Dec. 11, 1986

[30] Foreign Application Priority Data

Dec. 23, 1985 [EP] European Pat. Off. ........ 85116503.5

[51] Int. Cl.[4] .............................................. G01B 9/02
[52] U.S. Cl. .................................. 356/351; 356/359; 356/371
[58] Field of Search ............... 356/351, 359, 360, 371, 356/376

[56] References Cited

U.S. PATENT DOCUMENTS

| | | | |
|---|---|---|---|
| 3,619,023 | 11/1971 | Brooks | 356/360 X |
| 4,298,283 | 11/1981 | MaKosch et al. | 356/351 |
| 4,358,201 | 11/1982 | MaKosch | 356/351 |
| 4,498,771 | 2/1985 | MaKosch et al. | 356/351 |

OTHER PUBLICATIONS

K. Almarzouk, "Three-Beam Interferometric Profilometer", Applied Optics, Jun. 1983, vol. 22, No. 12, pp. 1893–1897.

*Primary Examiner*—Davis L. Willis
*Assistant Examiner*—Matthew W. Koren
*Attorney, Agent, or Firm*—Stephen J. Limanek

[57] ABSTRACT

A surface is subjected to a light field whose intensity is periodically modulated in a vertical direction to evaluate a scattered light pattern. The light field is obtained from interference between a first or central beam with vertical incidence and two symmetrical laterally disposed beams with oblique incidence. All beams are focussed to a common spot if the profile is obtained by scanning the surface or are superimposed as collimated beams if large area profiling is desired. The surface is imaged onto a diaphragm which selects appropriate locations of the surface for measurements by a photodetector to record sinusoidal intensity variations that are obtained when the light is periodically shifted in a vertical direction by phase modulating the first or central beam with respect to the lateral beams.

10 Claims, 7 Drawing Figures

METHOD AND ARRANGEMENT FOR OPTICALLY DETERMINING SURFACE PROFILES

TECHNICAL FIELD

This invention relates to a method for optically determining surface profiles and to an apparatus for carrying out the method.

BACKGROUND ART

Modern manufacturing processes and quality assurance methods often require very accurate measurements of surfaces with respect to their planarity, profile or roughness. Preferably, such measurements are to be carried out in situ, e.g., in an etching environment.

Optical methods are known for this purpose. They are very sensitive and do not require a physical contact, like mechanical probes, with the sample. For measurement accuracies in the micrometer range focus methods or light sectioning methods are available. Both are based on observing light patterns that are projected onto the surface under test and change when height variations occur. In the former case, the shape of a focussed light spot is analyzed (and kept constant in a closed-loop control system) and in the latter the lateral displacement of a light spot or a light band is determined. Moiré techniques project the shadow of a grating onto the surface under test which is observed through another grating. They also belong to the light sectioning methods with resolutions in the micrometer range.

For higher accuracy up to the submicron and nanometer range interferometric methods could be used where height variations of the surface lead to phase changes of a measurement beam which, after reflection at the surface, is superimposed with a reference beam to obtain an interferometric fringe pattern. Such interferometric methods are, however, limited to regularly reflecting, smooth surfaces as a rough and scattering surface will destroy the phase relation of the beams. Rough surfaces can only be analyzed interferometrically if oblique angles of incidence are used at the price of a complicated optical set-up, shadow-casting and non-applicability to roughness measurements. Another drawback of interferometric methods lies in the limited unique measuring range (in the order of half the wave length for monochromatic illumination) so that surfaces with pronounced profiles are only difficult to be measured.

Known interferometric methods use two or more interfering beams. An example of a three-beam interferometric profile measuring arrangement is described in Applied Optics, Vol. 22, No. 12, pages 1893–1897, published June 15, 1983 by K. Almarzouk. The phase of the middle beam is influenced by the thickness of an object with respect to the two symmetrical reference beams that are reflected at reference areas reserved on the sample. Apart from high reflectivity, this method, therefore, requires also a special sample preparation.

DISCLOSURE OF THE INVENTION

It is, therefore, an object of the present invention to provide a method of the aforementioned kind that allows accurate interference measurements at rough and scattering surfaces with high speed, and, additionally, an apparatus for carrying out the method.

According to this invention the surface to be measured is subjected to a spatial light field whose intensity varies sinusoidally in both the lateral and the vertical direction. This light field is generated by superimposing three coherent non-colinear light beams that interfere with each other. The surface illuminated by this brightness-modulated light field will thus show an intensity pattern that is determined by the local height of the surface profile. For sensitive measurements the light field is periodically shifted in vertical direction by modulating the phase of one of the beams, e.g., in an electro-optical modulator, and by recording the phase from the sinusoidal intensity measurement taken at a particular point of the surface.

The pitch of the intensity variation in the vertical direction can be changed by modifying the angle that is included between the incident beams. A unique measurement range can be set between 2 $\mu$m and several cm. The vertical measurement resolution is $3 \times 10^{-3} \times \Delta Z$ which corresponds to about 6 nanometers in a $\Delta z = 2$ $\mu$m measurement range. The measurement cycle time is of the order of milliseconds. If focussed beams are used the lateral resolution is only limited by the resolving power of the objective lens. If non-focussed incident beams are used measurements of large areas on scattering surfaces are also possible.

These characteristics make the proposed method as versatile as mechanical probes without incurring the danger of damaging the surface under test. The method is applicable to smooth and rough surfaces, e.g., etched, coated or polished.

The change of the light phase that occurs upon reflection at certain materials is immaterial to the proposed method. The apparatus to carry out the method is relatively simple and uses birefringent elements to split the output beam of a laser into the required three incident beams. An electro-optical modulator provides the necessary relative phase shift for the dynamic measurement which is inherently accurate because the phase in the output signal is evaluated (and not the amplitude).

Embodiments of the invention will now be described with reference to the drawings.

BEST MODE FOR CARRYING OUT THE INVENTION

Figure 1:
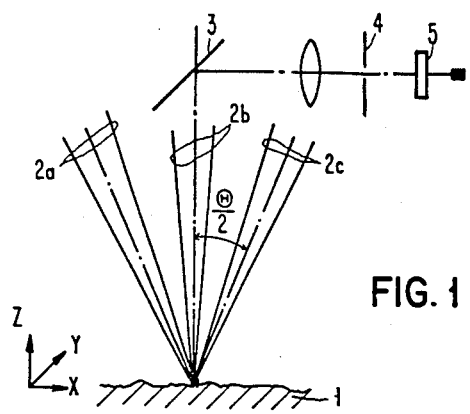
FIG. 1 is a schematic illustration of a first embodiment of the invention where three non-colinear beams are focussed in one sensing spot that is movable relative to an object surface.

Referring to the drawings in more detail, there is illustrated in FIG. 1 a surface 1 whose profile is to be determined by a light spot whose intensity is periodically modulated in the z-direction and which moves relative to the surface in the x-direction. Such a light spot is generated in a suitable optical system from a focussed central beam 2b which is brought to interference on surface 1 with two symmetrical, focussed, coherent beams 2a and 2c whose axes include an angle $\theta/2$ with the central beam. The intensities of the symmetrical lateral beams and the central beam are Io and Ii, respectively. The polarization directions of the three coherent beams have at least one parallel component to each other.

The light scattered at surface 1 is deflected by a semitransparent mirror 3 to a photodetector 5 which measures the light intensity in an area selected by a diaphragm 4 within the image plane of surface 1 that is defined by a suitable optical system. This light intensity varies when the illuminating light spot traverses areas with different heights. The surface 1 can be regularly reflecting or diffusely scattering.

The relative movement is best achieved by translating the surface 1. If the beams are to be scanned, possible relative phase shifts and the possibly oblique incidence on the test surface must be taken into account.

Figure 2:
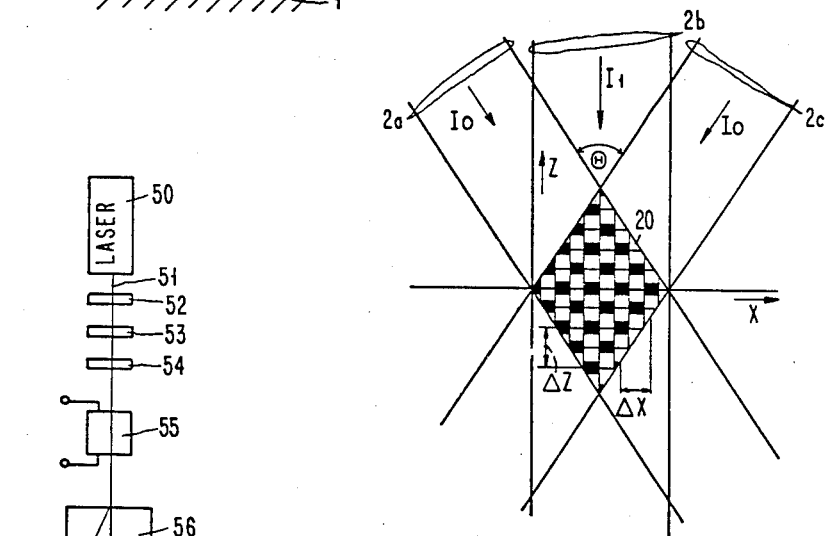
FIG. 2 is a schematic representation of the intensity distribution in the sensing spot of FIG. 1, FIGS. 3A and 3B show the intensity distribution along the x-direction as observed in seven different planes (z=constant)

FIG. 2 shows the intensity distribution in the area in which the three beams 2a, 2b and 2c interfere with each other, assuming small aperture angles. The part of FIG. 2 below the x-axis will be cut off when the surface 1 according to FIG. 1 is introduced.

The intensity pattern 20 of FIG. 2 can be approximated for small aperture angles by $$I(x,y) = I_i + 4I_o \cdot \cos^2 Bx + 4\sqrt{I_i I_o} \cdot \cos(AZ+\psi) \cdot \cos Bx \quad (1)$$

where
  $I_i$ = intensity of the central beam
  $I_o$ = intensities of the symmetrical beams
  $k = Z\pi/\lambda$ wave number and wave length
  $A = k \cdot (1 - \cos(\theta)/2)$
  $B = k \cdot \sin(\theta/2)$,
  $\theta$ angle included between the axes of the symmetrical beams
  $\psi$ arbitrary additional phase difference that may exist between the central beam and the symmetrical beams.

The intensity distribution represented by equation (1) is periodic both in the variable X and in Z, i.e., the light distribution is periodically modulated in the X-direction and in the Z-direction with periods $$\Delta Z = \frac{2\pi}{A} = \frac{\lambda}{1 - \cos\frac{\theta}{2}}$$

and $$\Delta X = ZW = \frac{2\pi}{B} = \frac{\lambda}{\sin\frac{\theta}{2}}.$$

The fringe pattern is parallel to the y-axis.

Figure 3A:
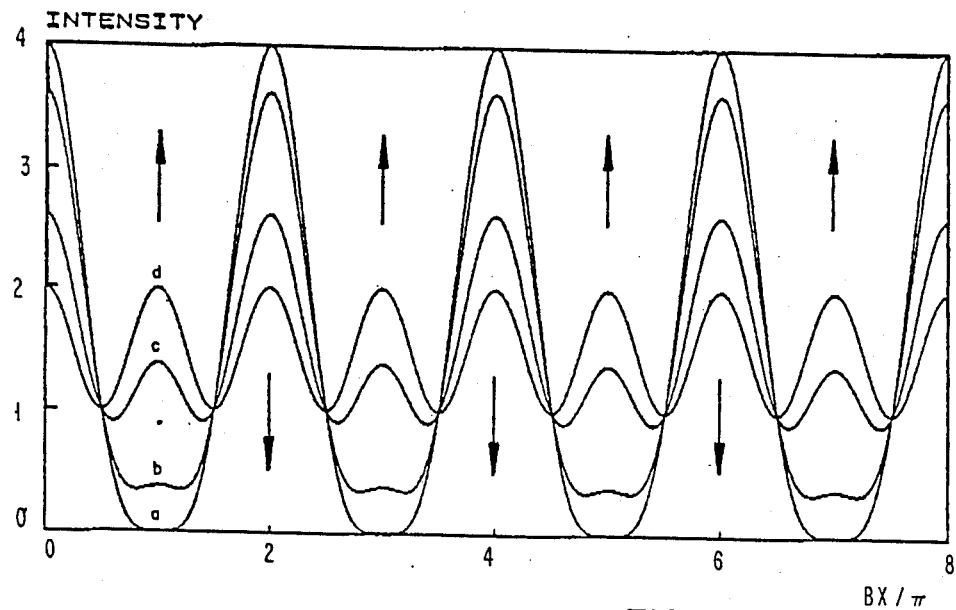
Figure 3B:
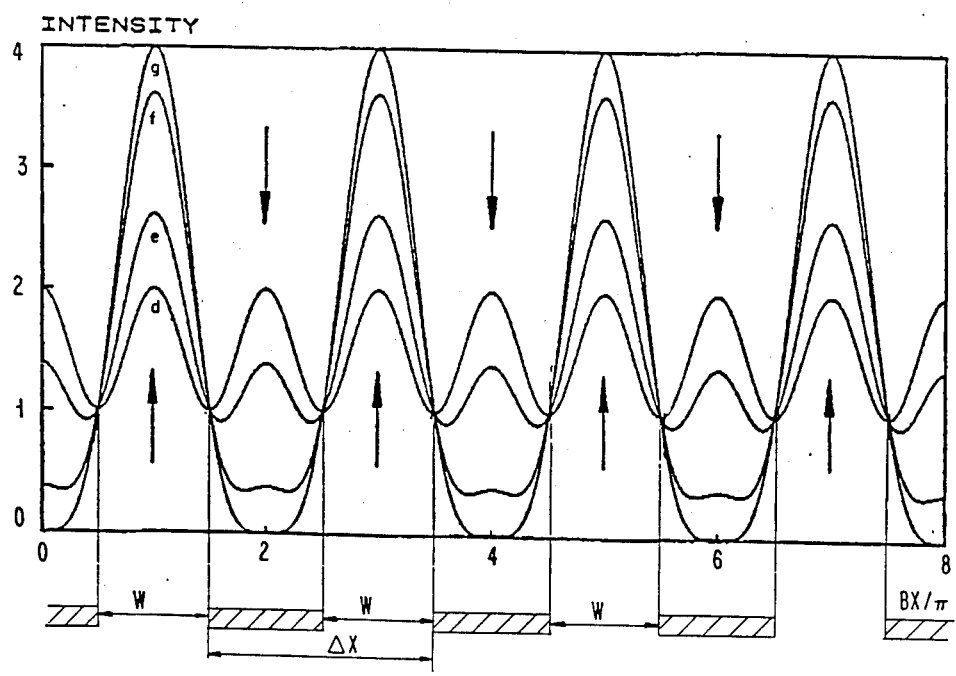

FIGS. 3A and 3B show graphs of intensity distributions a–g along the X-direction for the seven different horizontal planes where $AZ \div \pi = 0, 0.2, 0.4, 0.5, 0.6, 0.8$ and 1, respectively, with $I_i = 4Io$ and $\psi = 0$. It is readily apparent that the intensity distribution resembles a standing wave with nodes $$X_n = \frac{\pi}{B} \cdot \frac{2n+1}{Z}, (n = 0, 1, \ldots),$$

in between the intensity oscillates as a function of the variable Z. In one interval W between two nodes the intensity change is opposite to the intensity change in the adjacent interval (this is indicated by the arrows in FIGS. 3A and 3B).

From FIGS. 3A and 3B, it is further apparent that the intensity change at a fixed location x as a function of the height z is also sinusoidal. If the integral intensity is calculated within an interval W between two nodes as a function of z the following expression is obtained:

$$I_p = c_0 + c_1 \cdot \cos(AZ + \psi)$$

where $c_0$ and $c_1$ are constants.

Figure 4:
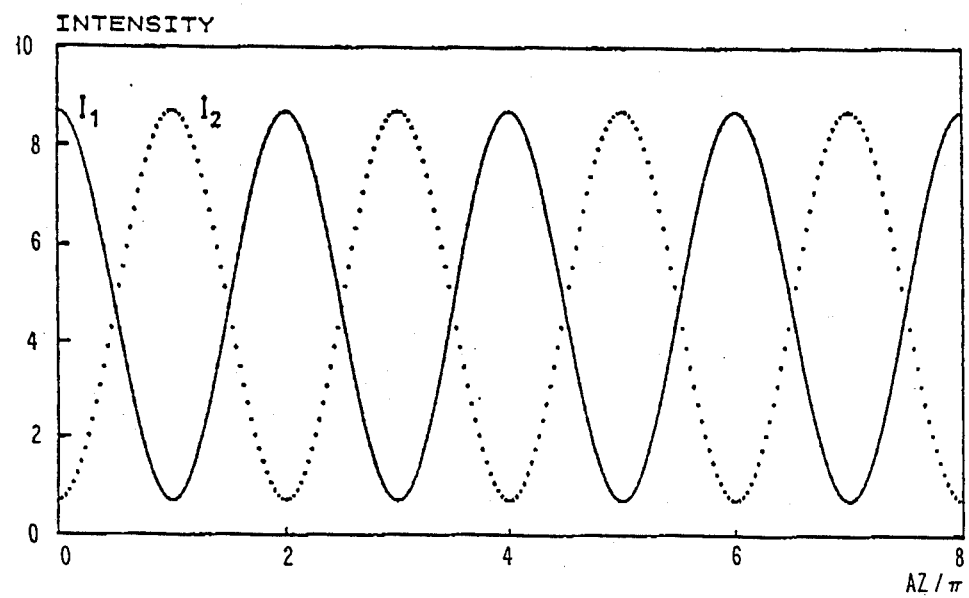
FIG. 4 shows the integral intensity variation as a function of the height (z) in one measurement interval (continuous line) and the adjacent measurement interval (dotted line) of FIGS. 3A and 3B.

This intensity plot is represented in FIG. 4 for two adjacent intervals (full line and dotted line, respectively).

This sinusoidal intensity variation within an interval W as a function of z is analogous to intensity variations that are obtained in fringes of conventional interference systems when the phase of one of the interfering beams is changed continuously. Therefore, the intensity signal obtained here can be evaluated with the same sensitive methods that are applied to interference signals although the basic physical principle of evaluating surfaces is totally different in the present case.

Figure 5:
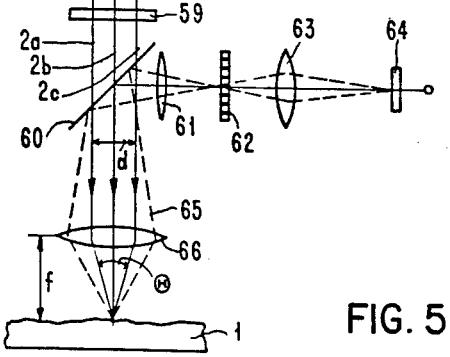
FIG. 5 shows the schematic set-up of an optical apparatus to carry out the method of FIG. 1.

FIG. 5 shows in a schematic optical drawing an apparatus for carrying out the above method using a focussed intensity modulated light spot. A laser 50, e.g., a He-Ne laser generates an intense monochromatic light beam 51 which passes a first half-wave plate 52, a polarizer 53 and a second half-wave plate 54 before entering an electrio-optic phase modulator 55 which divides beam 51 in two partial beams which are polarized perpendicularly to each other. These two colinear partial beams enter a calcite crystal 56 where they are split into two light beams 20a and 20b travelling as an ordinary beam along the optical axis and as an extra-ordinary beam oblique to that axis, respectively. The central beam 20b passes through a central opening in a third half-wave plate 57 which rotates the polarization direction in the off-set beam 20a by 45°. Both beams enter a second calcite crystal 58 whose optical axes are chosen such that the central beam 20b passes undeflected whereas the offset beam 20a is again split into two beams which leave the calcite crystal 58 symmetrically to the central beam 20b. To achieve this result the second calcite crystal 58 is twice as long as the crystal 56. The three exit beams 2a, 2b and 2c of crystal 58 pass through a polarizer 59 and a beam splitter 60 to be focussed by an optical system 66 in a common spot on surface 1. The light that emerges from surface 1, e.g., the scattered light is collected by the lens 66 into a light cone 65 and deflected by the beam splitter 60 to be focussed by a lens 61 on a diaphragm 62. Part of the light reaches eventually a photodetector 64 via a lens 63.

This optical arrangement thus provides the three symmetrical light beams 2a, 2b and 2c that are necessary to obtain an intensity modulated light spot on surface 1. The phase and the relative intensities of these beams can be varied using the components 52, 54, 55 and 57 in the following way: rotating the first half-wave plate 52 with respect to the fixed polarizer 53 and to the fixed polarization direction of the laser exit beam 51 provides a smooth attenuation of all three beams 2a, 2b and 2c, rotating the second half-wave plate 54 changes the intensity ratio between the central beam 2b and the lateral beams 2a and 2c, and rotating the third half-wave plate 57 the intensities of the lateral beams can be set equal.

Polarizer 59 (or a forth half-wave plate) selects parallel polarization components in the three beams 2a, 2b and 2c so that these can interfere and generate the desired intensity modulated light spot. The angle included between the focussed lateral beams is determined by the separation d of the lateral beams and the focal length f of the optical system 66 according to the relation $$(\theta/2) = \arctan(d/f)$$

The phase difference between the central beam 2b and the lateral beams 2a and 2c can be changed periodically by applying an alternating voltage to electro-optic modulator 55 for a phase sensitive measurement of the output signal of the photodetector 64.

The beam separation d is determined by the length of the crystals 56 and 58. The diaphragm 62 in the path of the light returning from surface 1 coincides with the image plane of the test surface with respect to the optical elements 61 and 66 and is oriented such that one or several of uniformly varying intervals W are selected for integral light intensity measurements by the photodetector 64. If a periodical grating is used as diaphragm 62 its transparent sections must coincide with the images of the alternate intervals W as is schematically shown in the bottom line of FIG. 3B. The grating constant g must thus satisfy the equation:

$$g = M \cdot \Delta x$$

where M is the linear magnification in imaging surface 1 to grating 62. If high spatial resolutions of up to 1 $\mu$m are required in profiling surface 1 a hole or slot diaphragm 62 can be used with a concomitant loss of light intensity. This high resolution is of importance for roughness measurements.

The selection of intervals W with synchronous change of light intensity upon variation of the height of surface 1 yields the sinusoidal output signal of the photodetector 64 that is represented in FIG. 4. If the phase of this output signal is periodically changed either by the electro-optic modulator 55 or by wobbling the vertical position of the surface itself the output signal of the photodetector 64 can be evaluated with very high accuracy to determine minute height variations when surface 1 is scanned. A detailed description of the modulation technique with an electro-optic crystal is given in U.S. Pat. No. 4,298,283, "Interferometric Measuring Method," G. Makosch et al.

The accuracy of this phase sensitive evaluation is of the order of $3 \times 10^{-3} \times 2\pi$, where in the present case a full interval $2\pi$ corresponds to the vertical periodicity $\Delta Z$ in the focussed light spot. The height resolution of the proposed profiler, is therefore, $$\delta Z = 3 \cdot 10^{-3} \Delta Z.$$

As it was already mentioned the value of $\Delta Z$ can be varied in a wide range by appropriately setting the angle $\theta$ between the lateral beams. In an experiment with various optical systems 66, the following results were obtained for a beam separation of d=2.7 mm:

| f [mm] | $\Delta X$ [$\mu$m] | $\Delta Z$ [$\mu$m] |
|---|---|---|
| 50 | 5.87 | 435 |
| 25 | 2.95 | 109 |
| 12 | 1.44 | 26 |
| 5 | 0.67 | 5 |
| 2.5 | 0.43 | 2 |

Height changes and vertical deviations can thus be measured with an accuracy in the nanometer range. The electro optic modulation technique further allows measurement times in the order of fractions of a second.

Figure 6:
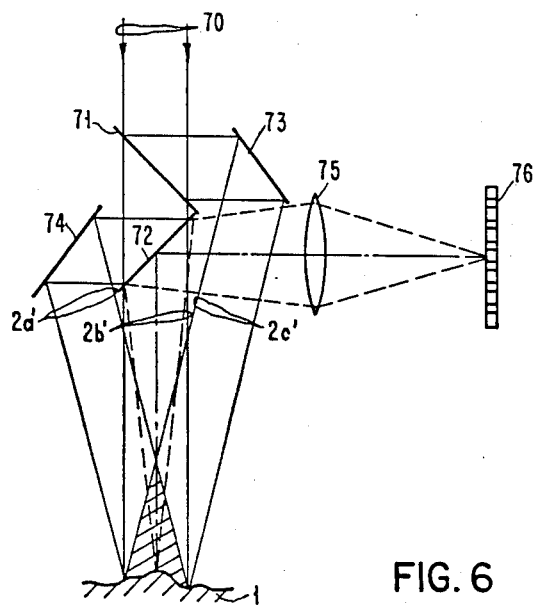
FIG. 6 illustrates a second embodiment of the invention for contour mapping or profiling large diffusely scattering surfaces.

FIG. 6 illustrates a second embodiment of the method described above where three collimated beams 2a', 2b' and 2c' are generated by beam splitters and mirrors 71-74 and brought to interference in a symmetrical arrangement. In the area (hatched) in which the 3 beams interfere, a light field is generated that is modulated in a lateral and a vertical direction. When a surface 1 is brought into this light field dark and bright stripes are visible according to the location in the intensity modulated light distribution and the local height of the surface. The scattered light is again collected by a lens 75 which images surface 1 onto a diaphragm 76 to select those intervals in the scattered light field in which the intensities vary synchronously as a function of the height.

For a plane surface 1, the observable light pattern consists of parallel fringes of period $\Delta X$ which has to be matched to the grating constant in th grating diaphragm 76 if an integral light measurement is to be carried out. Height variations in the surface 1 generate a pattern with contour lines similar to that obtained in conventional Moiré techniques. The line separation is determined by the vertical periodicity $\Delta Z$ in the light field. A measurement with high lateral spatial resolution is obtained with point or slot diaphragms 76. Periodic modulation of the intensity field by appropriately shifting the relative phases of the beams 2a, 2b and 2c yields again high measurement accuracy.

The essentially vertical illumination of surface 1 in FIG. 6 avoids the shadow effects that tend to disturb conventional Moiré techniques with oblique beam incidence.

The illumination of a test surface with a light field whose intensity varies sinusoidally in vertical direction is a new principle which overcomes the limits that were heretofore set for interferometric methods by the requirement of preserving the phase relationship of the interfering beams upon interactions with the measurement objects.

On the other hand, the high accuracy of interferometric measurements is maintained by performing a dynamic measurement in which the intensity pattern is periodically modulated for phase measurements in the measured intensity signal.

While the invention has been particularly shown and described with reference to preferred embodiments thereof, it will be understood by those skilled in the art that various changes in form and details may be made therein without departing from the spirit and scope of the inventions.

What is claimed is:

1. A method of optically determining the profile of a surface comprising the steps of illuminating said surface with a first light beam with substantially vertical incidence, superposing said first light beam in the area of said surface with two coherent light beams that impinge symmetrically to the first light beam under selectable oblique angles of incidence to generate a three-beam interference field with a periodic intensity modulation in a vertical direction, and measuring the intensity of the light emanating from selected areas of said surface.

2. A method of optically determining the profile of a surface as set forth in claim 1 wherein said first light beam and said two coherent light beams are focussed in a common spot on said surface which is moved relative to said spot.

3. A method of optically determining the profile of a surface as set forth in claim 1 wherein said first light beam and said two coherent light beams are collimated beams.

4. A method of optically determining the profile of a surface as set forth in claim 1 wherein measurement locations are selected by a diaphragm in the image plane of said surface defined by an optical system.

5. A method of optically determining the profile of a surface as set forth in claim 4 wherein said diaphragm is an optical grating that is matched to the intensity periodicity of an illuminating light field.

6. A method of optically determining the profile of a surface as set forth in claim 1 wherein a periodic displacement between said surface and a periodic light field is maintained to analyze the phase of a signal of the measured light intensity.

7. Apparatus for optically determining the profile of a surface comprising means including a laser for producing a polarized light beam along an optical axis, a series arrangement of a first birefringent element having a crystal axis, a λ/2 plate having a central opening therein and a second birefringent element having a crystal axis and having twice the length of said first birefringent element disposed to receive said polarized light beam, the crystal axes of said birefringent elements being chosen such that said polarized light beam is split into first, second and third output light beams travelling in and symmetrically parallel to said optical axis, means including a first optical imaging system for focusing first, second and third output light beams into a common spot on said surface, a diaphragm, means including a second optical imaging system for imaging said surface onto said diaphragm, and photodetecting means for measuring the light intensity passing through said diaphragm.

8. Apparatus for optically determining the profile of a surface as set forth in claim 7 further comprising means including an electro-optic modulator for periodically shifting the phase of said first output light beam with respect to said second and third beams disposed between said polarized light beam producing means and said diaphragm.

9. Apparatus for optically determining the profile of a surface as set forth in claim 8 further including a first λ/2 plate, a polarizer, and a second λ/2 plate disposed between said polarized light beam producing means and said electro-optic modulator.

10. Apparatus for optically determining the profile of a surface comprising means for producing a collimated input beam, first and second mirrors, means including first and second beam splitters arranged in the path of said collinated input beam to direct partial beams to said first and second mirrors for deflecting said partial beams symmetrically onto said input beam on said surface, a diaphragm, a photodetector, and means including an optical imaging system disposed in the output path of said second beam splitter for imaging said surface onto said diaphragm, said diaphragm being disposed between said imaging means and said photodetector.

* * * * *